United States Patent
Hackett et al.

(10) Patent No.: US 6,182,894 B1
(45) Date of Patent: Feb. 6, 2001

(54) SYSTEMS AND METHODS FOR AUTHORIZING A TRANSACTION CARD

(75) Inventors: Ann Hackett, Phoenix; Lisa Arnold, Glendale; Vickie Jordan, Phoenix, all of AZ (US)

(73) Assignee: American Express Travel Related Services Company, Inc., New York, NY (US)

( * ) Notice: Under 35 U.S.C. 154(b), the term of this patent shall be extended for 0 days.

(21) Appl. No.: 09/181,734

(22) Filed: Oct. 28, 1998

(51) Int. Cl.[7] .................................................. G06K 5/00
(52) U.S. Cl. .................................... 235/380; 235/382.5
(58) Field of Search .................................... 235/380, 375, 235/382, 382.5, 379; 380/23

(56) References Cited

U.S. PATENT DOCUMENTS

| | | |
|---|---|---|
| 4,643,453 | 2/1987 | Shapiro et al. . |
| 4,734,568 | 3/1988 | Watanabe . |
| 4,798,403 | 1/1989 | Nelson . |
| 4,831,245 | 5/1989 | Ogasawara . |
| 4,837,422 * | 6/1989 | Dethloff et al. ................. 235/380 |
| 4,947,027 | 8/1990 | Golightly . |
| 4,998,279 * | 3/1991 | Weiss .................................. 380/23 |
| 5,168,520 * | 12/1992 | Weiss .................................. 380/23 |
| 5,239,538 * | 8/1993 | Tell, Jr. et al. ................ 370/58.3 |
| 5,251,259 * | 10/1993 | Mosley ............................... 380/23 |
| 5,259,649 | 11/1993 | Shomron . |
| 5,276,314 * | 1/1994 | Martino et al. ................. 235/380 |
| 5,341,428 * | 8/1994 | Schatz ................................ 380/23 |
| 5,343,529 * | 8/1994 | Goldfine et al. .................. 380/23 |
| 5,400,082 | 3/1995 | Kamiya . |
| 5,615,277 * | 3/1997 | Hoffman ........................... 382/115 |
| 5,617,470 | 4/1997 | DePasquale . |
| 5,627,355 | 5/1997 | Rahman et al. . |
| 5,742,035 | 4/1998 | Kohut . |

OTHER PUBLICATIONS

Shaughnessy, John, Vice President, Fraud Reduction Programs, "Authorization Message Will Be Adapted to Accommodate Card Verification value 2 Processing", Feb. 1998, Visa Net Processor Digest, pp. 6–7.

\* cited by examiner

Primary Examiner—Thien M. Le
(74) Attorney, Agent, or Firm—Snell & Wilmer L.L.P.

(57) ABSTRACT

Instead of a PIN which is associated with an account and provides access to an account, a card identification code, which is located on the card but does not provide automatic access to an account, is used to verify that the consumer currently possesses the transaction card at the time of purchase and/or is the true card owner. At the time of card printing, an embossing file of account codes including associated identification codes is created and loaded into the account database. At the time of authorization, the identification code and the account code are entered into a POS device and sent to an authorization system. If the identification codes match, and other authorization parameters are satisfied, the transaction card is authorized.

18 Claims, 5 Drawing Sheets

| ACCOUNT CODE | EXP. DATE | 4-DIGIT ID CODE | 3-DIGIT ID CODE | OTHER INFO |
|---|---|---|---|---|
| 1234  567891  11121 | 1/99 | 1765 | 212 | |
| 3141  516178  19202 | 1/00 | 8274 | 314 | |
| 2122  232435  26278 | 5/99 | 5933 | 103 | |
| 3456  789101  12134 | 7/98 | 4116 | 149 | |
| 5678  910112  13145 | 6/99 | 3821 | 586 | |
| 1617  181920  21222 | 5/99 | 9298 | 567 | |
| " | " | " | " | |
| " | " | " | " | |
| " | " | " | " | |
| " | " | " | " | |

*FIG. 4.*

SYSTEMS AND METHODS FOR AUTHORIZING A TRANSACTION CARD

BACKGROUND OF THE INVENTION

1. Technical Field

The present invention relates, generally, to transaction card fraud reduction systems and methods and, more particularly, to verifying that a consumer is in possession of a transaction card and/or is the true card owner during a purchase transaction.

2. Background Information

Transaction cards such as, for example, credit cards, debit cards, bank cards, charge cards, smart cards and the like, have become increasingly popular for purchasing goods and services and for conducting other transactions. A transaction card typically includes information related to the issuer's name and logo, an account number, an expiration date and the cardholder's name. The cards may also have other information, serial number and/or the like printed on the card to represent other information about the transaction card or about the card member such as, for example, a group number, a promotion number, a card type number, a plastic issuance number and/or the like. Certain information is often embossed on the card with raised print, thereby allowing the information to be imprinted on a charge slip; however, the information that is unembossed (flat) would not be imprinted onto the charge slip. For many transaction cards, the information printed on the card is also contained within a magnetic stripe, a bar code and/or an integrated circuit (microchip) for automatic downloading/reading by a card reader.

Many card transactions are commenced by inserting, or sliding a card through, a card reader which automatically downloads the card information, thereby allowing the information to be used during the authorization process without the need for manual input or review of the card information. However, because of the substantial increase in fraudulent use and theft of transaction cards, the use of the card information is often supplemented by various fraud prevention techniques, such as requiring a signature to verify the consumer's agreement to the transaction or the entry of a PIN number to verify the consumer's authority to use the transaction card.

Additionally, certain card issuers, such as banks, incorporate the consumer's picture onto the face of the transaction card to give the merchant an additional verification procedure.

While the use of a signature, PIN or picture is effective for fraud reduction when the cardholder presents a card to a merchant, these options are not as effective, and may not be available, for other transactions. Particularly, transactions which do not require face-to-face contact between a consumer and merchant, such as the use of a transaction card to purchase items through the Internet or over the telephone (e.g., mail order). Moreover, many transactions may be alternatively completed without using the physical transaction card. For example, a consumer or merchant may simply key in the transaction card number into the keypad of a POS device or the keypad on an ATM.

When conducting Internet, telephone or keypad transactions, a cardholder may only need to provide a card account number and expiration date to allow the merchant to charge a particular account and verify that the transaction card is valid. Other verification information, such as a PIN number, is usually not disclosed because the PIN is typically memorized by the cardholder and never disclosed to anyone. Because merchants often only request limited information to conduct a transaction over the Internet or the telephone, an increased potential for fraud exists due to the increased availability of this general information. In other words, regardless of a consumer's possession of the physical transaction card, a consumer can still fraudulently obtain and provide this general information.

Particularly, cardholders often provide a transaction card number to telemarketers, merchants, bank tellers and Internet sites, thereby allowing a merchant or clerk to retain the credit card number and associated information for later fraudulent use. Moreover, a person may overhear a transaction card number being disclosed over the telephone or, with the increase of mailbox thefts, a person may obtain a credit card number from a billing statement or promotional literature. Furthermore, advanced computer operators are able to intercept transaction card numbers which are transmitted over modems and/or the Internet. Accordingly, when a merchant simply requests a credit card number from a consumer, it is difficult for the merchant to ensure that the consumer placing the order has the transaction card in his or her possession and/or is the true cardmember, rather than using a stolen account number.

As stated above, the use of PIN numbers are typically limited to face-to-face or ATM transactions wherein the consumer personally enters a PIN into a keypad and the merchant does not need to have knowledge of the PIN. In non face-to-face transactions, the PIN would need to be disclosed to the merchant. However, due to security concerns, consumers prefer to not disclose their private PIN number to merchants and especially prefer to not disclose the PIN number over a telephone or through the Internet. Particularly, a PIN number is directly associated with the account number, and as such, may provide increased access to a transaction card account during a fraudulent transaction. Accordingly, a system is needed which allows the consumer to disclose a security number which is associated with the account number, but does not allow automatic access to the account.

BRIEF SUMMARY OF THE INVENTION

Due to security concerns during non face-to-face commercial transactions, consumers prefer to not disclose their private PIN number to merchants and especially prefer to not disclose the PIN numbers over a telephone or through the internet. Instead of a PIN which is associated with an account and provides access to an account, a card identification code, which is located on the card but does not provide automatic access to an account, is used to verify that the consumer currently possesses the transaction card at the time of purchase and/or is the true card owner.

Along with the account number, a transaction card includes a non-embossed four-digit or three-digit number, called a card identification code. During creation of a transaction card, a five-digit identification code is calculated from the account number, four-digit or three-digit identification code and the expiration date based upon a predetermined algorithm. A four-digit identification code is printed on the front of the card, an associated five-digit identification code is entered into the magnetic stripe and an associated three-digit identification code is printed in the signature panel. An embossing file of account numbers including associated identification codes is created and loaded into the account database. At the time of authorization, the four-digit number on the front of the card and the account number are manually keyed into a POS device and sent to an authorization system. The four-digit number is matched to the four-digit number on file for that transaction card. If the four-digit numbers match, and other authorization parameters are satisfied, the transaction card is authorized.

Alternatively, when the card is swiped through a POS device, the five-digit number previously entered into the magnetic stripe, along with other information, is automatically transmitted to the authorization system. The five-digit number is decomposed using a mathematical algorithm, and the resulting three-digit and/or four-digit numbers are matched against the database record (which includes the originally assigned three or four-digit identification codes for the account number). If the respective three or four-digit numbers match, and other authorization parameters are satisfied, the transaction card is authorized.

Thus, the entry of an additional identification code helps verify that the consumer currently possesses the transaction card at the time of purchase or is the true card owner, rather than simply using a stolen account number. Accordingly, requiring entry of an identification code along with the account number provides an effective deterrent to fraudulent use of the account number. For example, systems and methods in accordance with the present invention at certain tested locations have provided fraud reduction of approximately 78%.

BRIEF DESCRIPTION OF SEVERAL VIEWS OF THE DRAWINGS

The subject invention will hereinafter be described in conjunction with the appended drawing figures, wherein like numerals denote like elements, and:

FIG. 4 is an exemplary schematic diagram of an authorization database with associated identification codes in accordance with an embodiment of the present invention; and, FIG. 5 is an exemplary flow diagram of the authorization process.

DETAILED DESCRIPTION OF THE INVENTION

To reduce fraud when conducting commercial transactions (i.e., the purchase of goods and services) using a transaction card 10, the present system requests entry of an additional number to help verify that the consumer has possession of the transaction card at the time of purchase or is the true card owner, rather than simply using a stolen account code. Wherein a PIN number is typically memorized and not written down, the present number, called a card identification code 14, 15 and 16, is preferably printed on or encoded in transaction card 10. Due to security concerns during non face-to-face transactions, consumers prefer to not disclose their private PIN number to merchants and especially prefer to not disclose the PIN number over a telephone or through the Internet. Instead of a PIN which is associated with an account and provides access to an account, a card identification code 14, 15 and 16, which does not provide automatic access to an account, is used to help verify that the consumer currently possesses the transaction card at the time of purchase and/or is the true card owner.

Figure 2A:
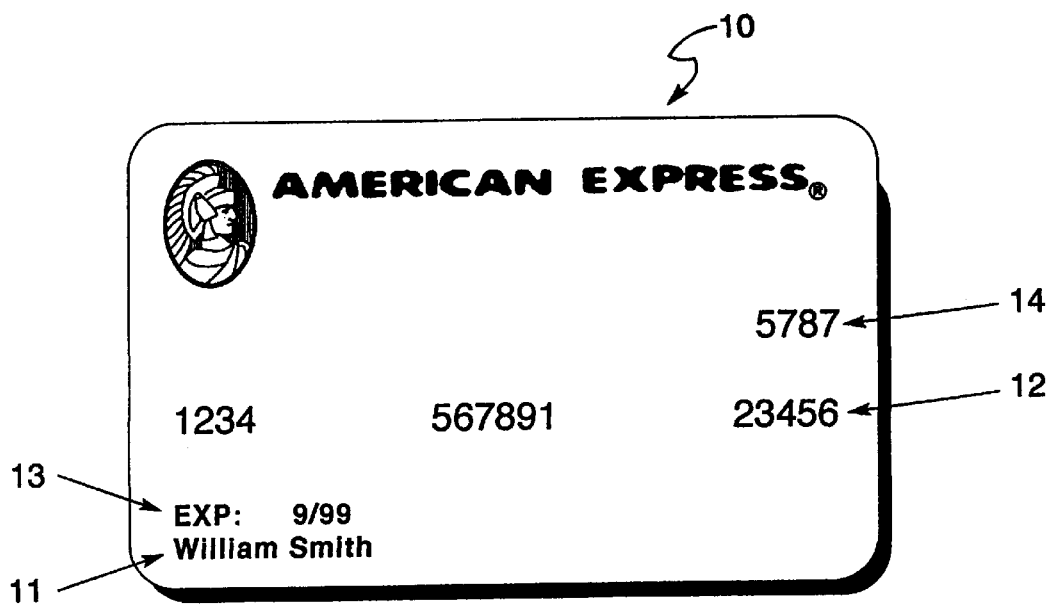
FIG. 2a is a front view of an exemplary transaction card showing an account number and card identification code.
Figure 2B:
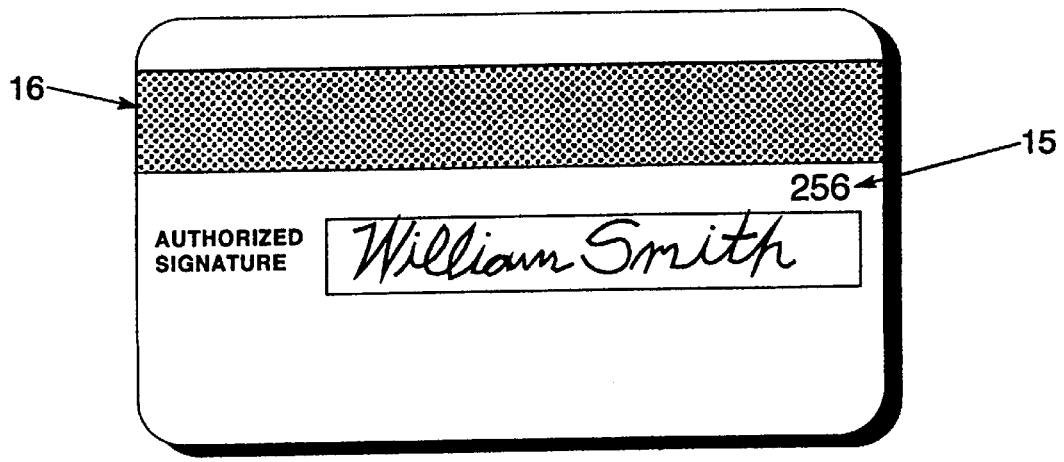
FIG. 2b is a rear view of an exemplary transaction card showing magnetic strip and card identification code.

With momentary reference to FIG. 2a, in accordance with the present invention, a transaction card 10 includes any device suitably configured to display an account code 12 and a card identification code 14. In a preferred embodiment, the transaction card is a credit card, charge card, debit card, smart card, bank card and/or the like. Transaction card 10 preferably includes information for conducting a transaction. In a preferred embodiment, the front face of transaction card 10 includes an account code 12 and a card identification code 14 located above account code 12. Account code 12 includes any number of characters (n characters) comprising any combination of numbers, letters, symbols or other indicia which are suitably configured to identify a transaction account. In a preferred embodiment, account code 12 is a 15-digit number which identifies an account code, including a routing number or other similar transaction numbers, corresponding to the card owner. One of ordinary skill in the art will appreciate that account code 12 may be associated with an individual account, a corporate account, an organization account, or any other entity and the account may represent a charge account, a credit account, a debit account, an electronic purse account, or any other financial account.

Card identification codes 14, 15 and 16 include any number of characters (n characters) comprising any combination of numbers, symbols, letters, or other indicia suitably configured to provide verification that the consumer has an actual card in possession at the time of purchase and/or is the true card owner, rather than simply using a stolen account code. In a preferred embodiment, card identification code 14 is printed on or encoded in transaction card 10. Card identification code 14 may be located on either side of the card, encoded into a medium on the card and may be embossed (raised lettering) or unembossed (flat) into the plane of the card. In a particularly preferred embodiment, card identification code 14 is located on the front face of transaction card 10 on the same side as, and above, account code 12. Moreover, card identification code 14 is preferably a four-digit, unembossed (flat) number printed within the plane of the card. One skilled in the art will appreciate that, along with other card member information, card identification codes 14, 15 or 16 may be initially printed on many transaction cards 10 before, during or after account code 12 is printed on transaction card 10. In a preferred embodiment, card identification codes 14 or 15 are logically related to card identification code 16.

Figure 1:
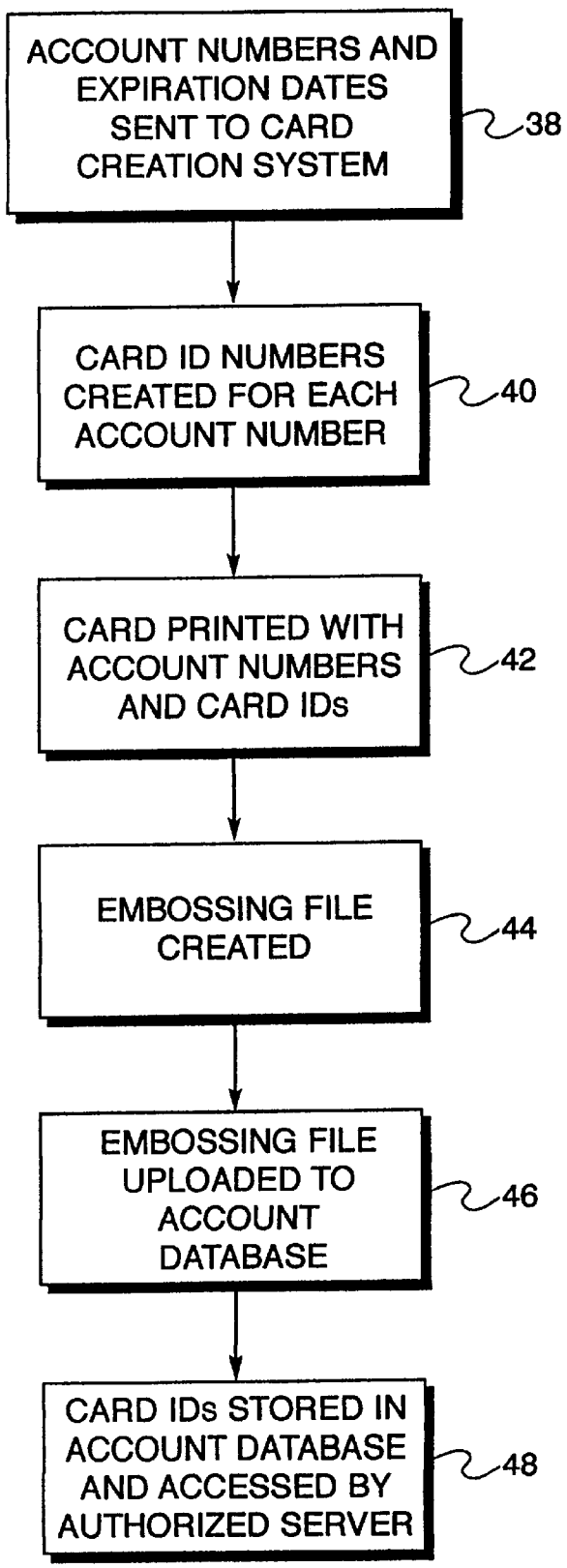
FIG. 1 is an exemplary flow diagram of the card creation and identification code creation process.
Figure 3:
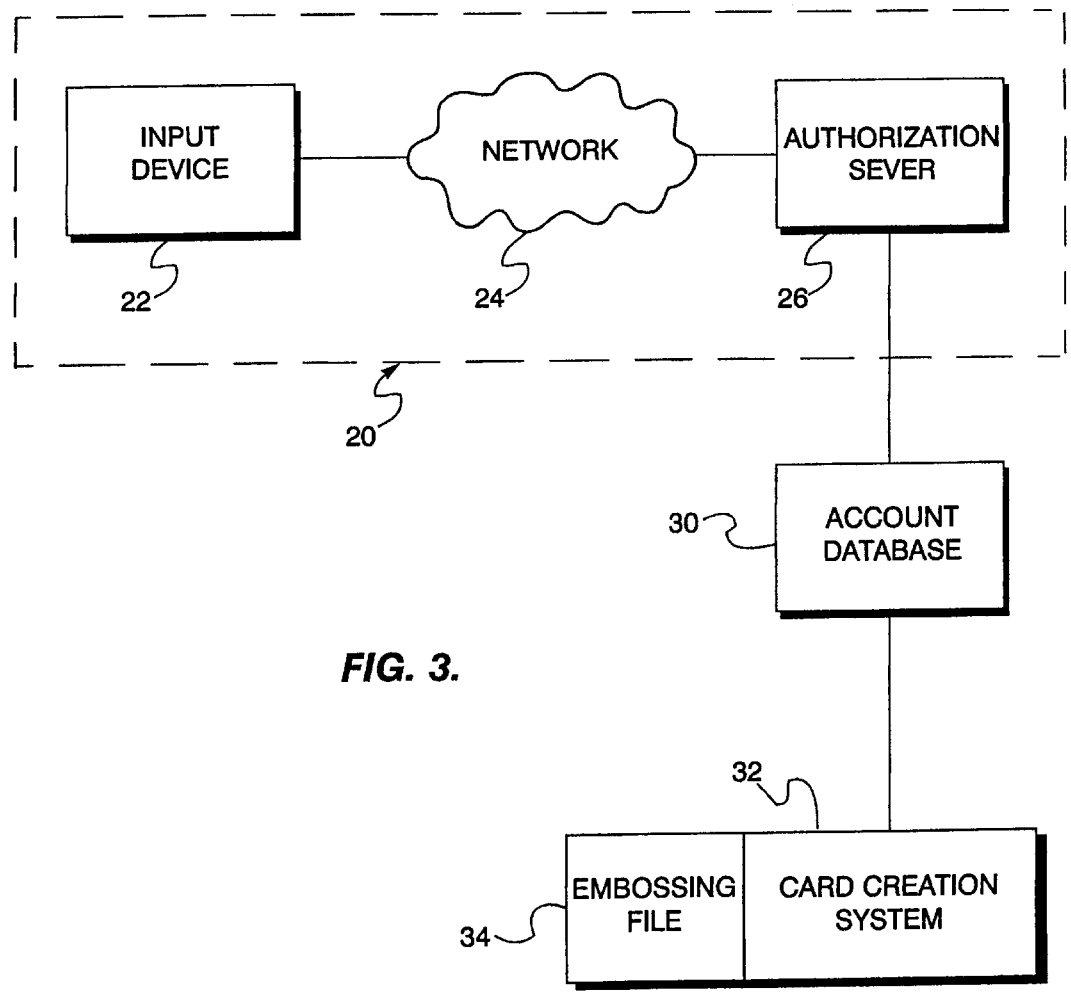
FIG. 3 is an exemplary schematic diagram of a simplified transaction card authorization system.

After a consumer is approved for a transaction card, an account code 12, a four-digit identification code 14 and/or a three digit code 15, an expiration date 13 and other information are associated with the consumer's name in an account database 30 (see FIGS. 2a and 3). With reference to FIGS. 1 and 3, account code 12, a four-digit identification code 14 (or a three-digit identification code 15), an expiration date 13 and other information from account database 30 are preferably transmitted to a card creation system 32 (step 38). In a preferred embodiment, at the time of creating transaction card 10 for the consumer in accordance with the present invention, a five-digit identification code 16 is suitably calculated from account code 12, four-digit identification code 14 or three-digit identification code 15 and expiration date 13 based upon a predetermined algorithm (step 40). Five-digit identification code 16 is preferably calculated and encoded into the magnetic stripe because five-digit identification code 16 provides additional security by not being disclosed on the face of the card (only four-digit code 14 or three-digit code 15 are visible).

After determining identification codes 14, 15 and 16, transaction card 10 is preferably created with an embossed account code 12, embossed expiration date 13, embossed consumer's name 11 and non-embossed card identification codes 14, 15 and 16 (step 42). Particularly, in a preferred embodiment, a four-digit identification code 14 is printed (non-embossed) on the front of card 10 above account code 12, an associated five-digit identification code 16 is encoded into the magnetic stripe and an associated three-digit identification code 15 is printed in the signature panel. One skilled in the art will appreciate that any one of the aforementioned card identification codes 14, 15 and 16 may exist throughout this process alone or in any combination with the other card identification codes. For example, only identification code 14 may appear on the front of the card without any codes on the back of the card or in the magnetic stripe. Moreover, identification codes 14, 15 and 16 may comprise any number of digits, symbols, characters, letters and/or the like and may be located in any location and in any medium on card 10. For example, an identification code may be encoded into an integrated circuit in a smart card embodiment.

Upon printing of transaction cards 10, an embossing file 34 including card identification codes 14, 15 and 16 is created (step 44). Embossing file 34 with associated identification codes 14, 15 and 16 is next uploaded into account database 30 (step 46). In a preferred embodiment, authorization server 26 communicates with, and analyzes the data within, account database 30 (step 48). Alternatively, the use of a Hardware Security Module allows embossing file 34 to provide a simplified, more direct transmission of embossing information to account database 30 without the need for maintenance uploads. In a particularly preferred embodiment, as shown in FIG. 4, identification codes are stored in a look-up table within account database 30.

Referring to FIG. 3, an exemplary authorization system 20, account database 30 and card creation system 32 is shown. Authorization system 20 is any authorization system suitably configured to authorize a transaction card and notify an input device 22 of the authorization status. One skilled in the art will appreciate that authorization system 20 can be an existing authorization system, such as the Central Authorization System used by American Express, which is re-programed or re-configured to preform the functions of the present invention or is a system specially configured to preform the functions of the present invention. In a preferred embodiment, authorization system 20 includes input device 22, network 24 and authorization server 26. input device 22 is any device suitably configured to accept transaction information and transmit the information for approval. In a preferred embodiment, input device 22 is a telephone, computer, point-of-sale terminal, ATM and/or the like. Input device 22 preferably communicates with network 24, wherein network 24 is any device or software suitably configured to transmit information. In a preferred embodiment, network 24 is a modem, a PSTN, an Internet, an Intranet, a direct link, or any combination thereof.

With continued reference to FIG. 3, network 24 provides a communication link between input device 22 and authorization server 26. Authorization server 26 is any device suitably configured to authorize a transaction and/or transaction card and notify input device 22 of the authorization status. In a preferred embodiment, authorization server 26 is a centralized authorization system including transaction account codes. One skilled in the art will appreciate that authorization server 26 can be a centralized database providing authorization information to various input devices 22.

Moreover, one skilled in the art will appreciate that authorization server 26 may include any combination of components, software, servers and computers suitably configured to not only authorize transactions and/or transaction cards, but also to provide additional transaction support such as report generation and promotional programs. Authorization server 26 is preferably in communication with, and interrogates, account database 30. One skilled in the art will appreciate that account database 30 can be a separate component, integrated into authorization server 26 or simply software within authorization server 26 or within input device 22. In a preferred embodiment, account database 30 includes a look-up table (see FIG. 4), thereby allowing verification of the association between account codes 12 and identification codes 14, 15 and 16.

Figure 5:
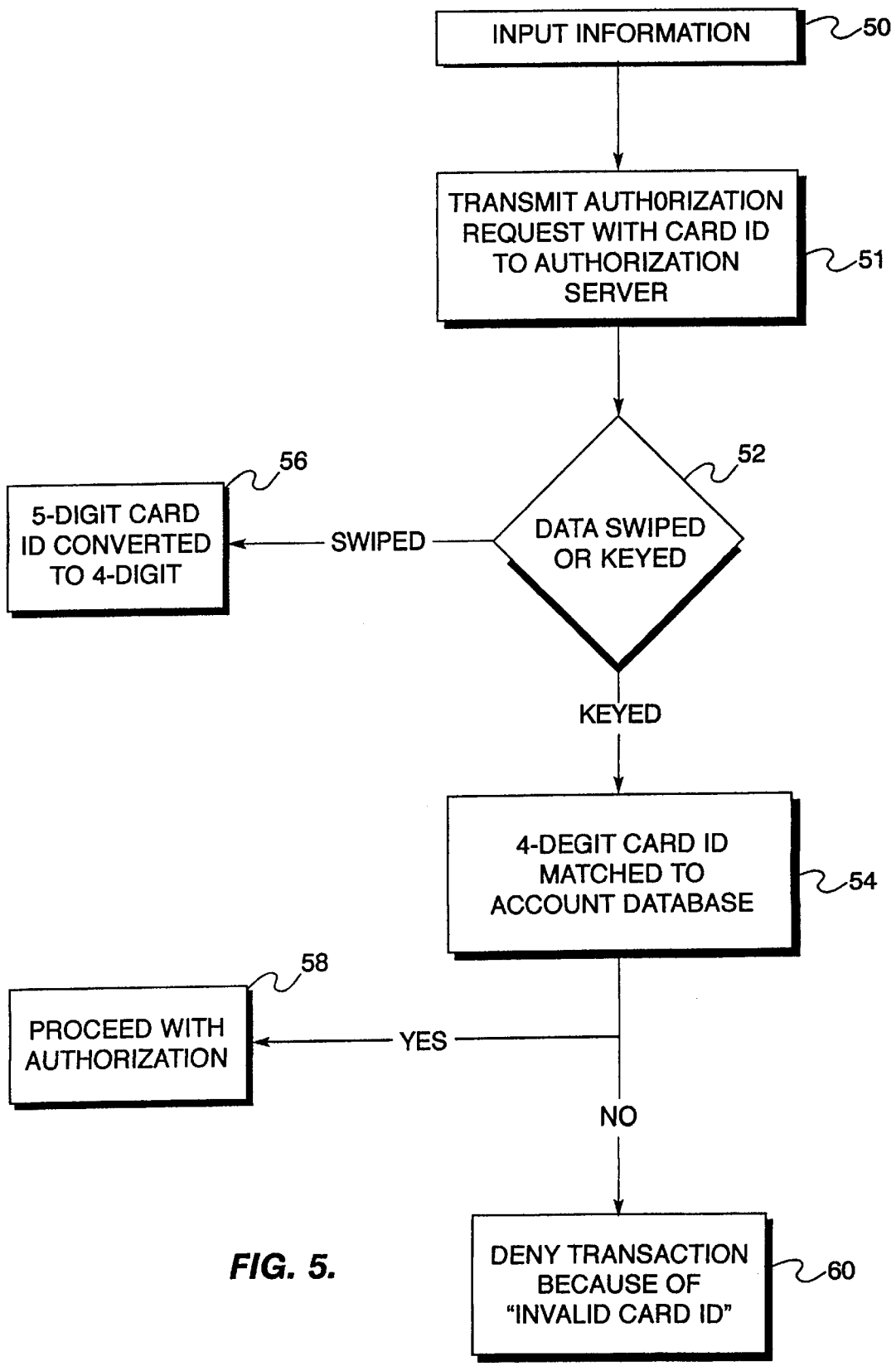

Referring to FIG. 5, when a consumer uses transaction card 10, a clerk, sales representative, merchant, consumer or other authorized person inputs account code 12 and card identification code 14, 15 or 16, along with any other transaction information such as purchase amount, etc., into input device 22 (step 50). In one embodiment, card identification code 14 or 15 is manually keyed into input device 22. The keyed information is sent via network 24 to authorization server 26 (step 25 51). Authorization server 26 suitably determines if the data was keyed in or swiped through input device 22 (step 52). In a preferred embodiment, to help determine if the data was keyed or swiped, the keyed data includes different formatting, uses different communication lines, different number of digits in the identification code and/or different header information than information read from the magnetic stripe.

After authorization server 26 determines that the information is manually keyed information, authorization server 26 suitably interrogates account database 30 to determine if the keyed identification code 14 or 15 matches the respective identification number on file for that transaction card (step 54). If the respective identification codes 14 or 15 match, the authorization process proceeds to determine if other authorization parameters are satisfied (step 58). If the respective identification codes 14 or 15 do not match, the transaction is denied and an "invalid Card ID" message is transmitted to the input device 22 (step 60). In an alternative embodiment, if the identification numbers do not correspond, authorization server 26 preferably prompts input device 22 to re-enter the card identification code and the process is repeated. If the numbers do not correspond again, transaction card 10 is denied.

When the card is swiped through a POS device 22, the five-digit number previously entered into the magnetic stripe, along with other information, is automatically transmitted to authorization server 26. Authorization server 26 suitably determines that the data originated from a magnetic stripe (step 52) by various methods such as, for example, data format, communication lines from which the data was sent, header information and/or the number of digits in the identification code. Authorization server 26 preferably decomposes the five-digit identification code 16 into a four-digit number using a predetermined mathematical algorithm (step 56). In a preferred embodiment, this algorithm is the inverse of the algorithm set forth above used to create the five-digit identification code 16. Alternatively, account database 30 includes five-digit identification codes 16 for each account code 12, thereby eliminating the need to transform the five-digit code 16 to a four-digit code 14. The algorithm is optimally a robust and secure algorithm which conforms to the Data Encryption Standard. Similar to above, authorization server 26 then suitably interrogates account database 30 to determine if the derived four-digit number 14 matches the four-digit number on file for that transaction card (step 54). If the fourdigit numbers match, the authorization process proceeds to determine if other authorization parameters are satisfied (step 58). If the four-digit numbers do not match, the transaction is denied and an "invalid Card ID" message is transmitted to the input device 22 (step 60). In an alternative embodiment, if the numbers do not correspond, authorization server 26 preferably prompts input device 22 to re-swipe the card identification code 16 and the process is repeated. If the numbers do not correspond again, transaction card 10 is denied.

In a further alternative embodiment, the incorporation of card identification code 14 into a particular authorization process is optional depending on the type of transaction card 10 or account code 12 used for the financial transaction. In other words, when authorizing a transaction, the same authorization system 20 may not require a card identification code 14 for particular account codes 12. For example, certain consumers may be enrolled in a promotional program which includes a cardless account without a card identification code 14. As such, while other verification means typically exist, authorization server 26 may not require entry of an identification code or account database 30 may include any suitable automatic authorization for certain ranges of account codes 12, regardless of entry of a card identification code 14.

In a preferred embodiment, account codes 12 are subject to periodic update as new card promotions or new accounts are opened. For security reasons, card identification codes 14, 15 or 16 are preferably only retained in authorization server 26 until authorization or rejection is received by input device 22. Moreover, in a preferred embodiment, card identification codes 14, 15 or 16 are not permanently stored in the input device 22 or the authorization server 26 and are not printed on documents (i.e., receipts, tickets, itineraries, etc.).

Although the invention has been described herein in conjunction with the appended drawings, those skilled in the art will appreciate that the scope of the invention is not so limited. Modifications in the selection, design and arrangement of various components and steps discussed herein may be made without departing from the scope of the invention as set forth in the claims. Moreover, the present invention may be described herein in terms of functional block components and various processing steps. It should be appreciated that such functional blocks may be realized by any number of hardware components configured to perform the specified function. For example, the present invention may employ various integrated circuit components, e.g., memory elements, digital signal processing elements, look-up tables, and the like, which may carry out a variety of functions under the control of one or more micro-processors or other control devices.

In addition, those skilled in the art will appreciate that the present invention may be practiced in any number of data communication contacts and that the authorization system described herein is merely one exemplary application for the invention. Further, it should be noted that the present invention may employ any number of conventional techniques for data transmission, training, signal processing and conditioning, and the like. Such general techniques that may be known to those skilled in the art are not described in detail herein.

We claim:

1. A system for authorizing commercial transactions comprising:

a transaction card having an n character account code and an n character identification code, wherein said identification code is not an expiration date and wherein said account code and said identification code have a predetermined logical relationship;

an input device for receiving said account code and said identification code; and, an authorization computer in communication with said input device, said authorization computer configured to confirm said predetermined relationship between said account code and said identification code.

2. The system of claim 1, wherein said transaction card is at least one of a credit card, debit card, bank card, charge card and smart card.

3. The system of claim 1, where in said identification code is unembossed.

4. The system of claim 1, wherein said account code and said identification code are on the same side of said transaction card.

5. The system of claim 1, wherein said input device is at least one of a keypad, POS terminal, ATM terminal, computer and telephone.

6. The system of claim 1, wherein said identification code is at least one of a three-digit number, four-digit number and five-digit number.

7. The system of claim 1, wherein said account code and said identification code are on the same side of said transaction card and said identification code is an unembossed four-digit number located above said account code.

8. The system of claim 1, wherein said authorization computer is configured to transform said identification code to a second identification code.

9. The system of claim 1, wherein said authorization computer communicates with an account database and said authorization computer is configured to confirm said predetermined relationship between said account code and said identification code by interrogation of said account database.

10. A method for obtaining an authorization for a commercial transaction comprising:

keying an n character account code and an n character identification code into an input device, wherein said identification code is not an expiration date and wherein said account code and said identification code have a predetermined logical relationship;

communicating, from said input device to an authorization computer, said account code and said identification code; and, receiving a confirmation from said authorization computer of said predetermined relationship between said account code and said identification code.

11. The method of claim 10, wherein said keying step includes keying said n character account code and said n character identification code into said input device, wherein said input device is at least one of a keypad, POS terminal, ATM terminal, computer and telephone.

12. The method of claim 10, wherein said keying step includes keying said account code and said identification code which are located on a transaction card, further wherein said account code and said identification code are printed on the same side of said transaction card and said identification code is an unembossed four-digit number located above said account code.

13. The method of claim 10, further comprising transforming, via said authorization computer, said identification code to a second identification code.

14. The method of claim 10, further comprising communicating between said authorization computer and an account database and confirming, via said authorization computer, said predetermined relationship between said account code and said identification code by interrogating said account database.

15. A transaction card for authorizing commercial transactions comprising:

an n character account code in a first field;

an n character identification code in a second field, wherein said identification code is not an expiration date;

wherein said account code and said identification code have a predetermined logical relationship;

said transaction card configured to provide, via an input device, said account code and said identification code to an authorization computer, wherein said authorization computer is configured to confirm said predetermined relationship between said account code and said identification code.

16. The system of claim 15, wherein said transaction card is at least one of a credit card, debit card, bank card, charge card and smart card.

17. The system of claim 15, wherein said account code and said identification code are on the same side of said transaction card and said identification code is an unembossed four-digit number located above said account code.

18. At an authority responsible for authorizing a transaction, a computer-implemented method for handling an authorization request, comprising the following steps:

receiving an n character account code and an n character identification code from an input device, wherein said account code and said identification code have a predetermined logical relationship;

confirming said predetermined relationship between said account code and said identification code; and, processing the authorization request.

* * * * *

(12) POST-GRANT REVIEW CERTIFICATE (2nd)

United States Patent
Hackett et al.

(10) Number: US 6,182,894 J1
(45) Certificate Issued: Oct. 23, 2014

(54) SYSTEMS AND METHODS FOR AUTHORIZING A TRANSACTION CARD

(75) Inventors: Ann Hackett; Lisa Arnold; Vickie Jordan

(73) Assignee: Intellectual Ventures II LLC

Trial Number:

CBM2014-00031 filed Nov. 12, 2013

Petitioners: Bank of America, N.A.; PNC Financial Services Group, Inc.; PNC Bank, N.A.

Patent Owner: Intellectual Ventures II LLC

Post-Grant Review Certificate for:

Patent No.: 6,182,894
Issued: Feb. 6, 2001
Appl. No.: 09/181,734
Filed: Oct. 28, 1998

The results of CBM2014-00031 are reflected in this post-grant review certificate under 35 U.S.C. 328(b).

POST-GRANT REVIEW CERTIFICATE
U.S. Patent 6,182,894 J1
Trial No. CBM2014-00031
Certificate Issued Oct. 23, 2014

AS A RESULT OF THE POST-GRANT REVIEW PROCEEDING, IT HAS BEEN DETERMINED THAT:

Claims 10-18 are cancelled.

\* \* \* \* \*